United States Patent
Cleriot et al.

(10) Patent No.: US 12,541,723 B1
(45) Date of Patent: Feb. 3, 2026

(54) METHODS FOR MANAGING NO-TOUCH MEETING ROOM CONFIRMATION THROUGH VIRTUAL ATTENDANCE AND DEVICES THEREOF

(71) Applicant: Comeen Inc., Austin, TX (US)

(72) Inventors: Simon Cleriot, Paris (FR); Gaétan Basile, Biscarrosse (FR); Benjamin Gauthier, Bordeaux (FR)

(73) Assignee: COMEEN INC., Austin, TX (US)

( * ) Notice: Subject to any disclaimer, the term of this patent is extended or adjusted under 35 U.S.C. 154(b) by 0 days.

(21) Appl. No.: 19/317,300

(22) Filed: Sep. 3, 2025

Related U.S. Application Data (60) Provisional application No. 63/757,742, filed on Feb. 12, 2025.

(51) Int. Cl.
*H04L 12/18* (2006.01)

(52) U.S. Cl.
CPC ..... *G06Q 10/0287* (2025.08); *H04L 12/1818* (2013.01)

(58) Field of Classification Search
CPC .......... G06K 19/06; G06K 7/14; G06Q 10/06; G06Q 10/10; G06Q 10/00; G06Q 10/02; G06F 16/29; G06F 3/0484; G06F 3/14; G06F 11/07; G06F 11/00; G06F 17/00; G06F 17/18
See application file for complete search history.

(56) References Cited

U.S. PATENT DOCUMENTS

| | | | |
|---|---|---|---|
| 2005/0018686 A1* | 1/2005 | Igarashi | H04W 48/20 370/395.2 |
| 2007/0162315 A1* | 7/2007 | Hodges | G06Q 10/02 705/7.12 |
| 2011/0106573 A1* | 5/2011 | McNamara | G06Q 10/109 705/5 |
| 2011/0178832 A1* | 7/2011 | Burchard | G06Q 10/103 705/7.12 |
| 2014/0149519 A1* | 5/2014 | Redfern | H04L 51/222 709/204 |
| 2019/0385127 A1* | 12/2019 | Hashimoto | G06F 16/176 |
| 2020/0104804 A1* | 4/2020 | Fujimura | G06Q 10/02 |
| 2022/0132202 A1* | 4/2022 | Obaidi | H04N 23/661 |

\* cited by examiner

*Primary Examiner* — Rayeez R Chowdhury
(74) *Attorney, Agent, or Firm* — Troutman Pepper Locke LLP (57) ABSTRACT

A method and device that manages no-touch meeting room confirmation through virtual attendance and is implemented by one or more meeting management computing devices includes identifying in a calendar application a reservation of one of one or more meeting rooms for one of a plurality scheduled time periods by a requesting client at one of one or more client devices. Next, there is monitoring for an initiation of a virtual communication with a virtual conferencing device assigned to the selected one of the meeting rooms during a confirmation time period correlated to the one of the scheduled time periods. A status notification for the selected one of the meeting rooms is generated and provided based on the monitoring detecting the initiation of the virtual communication with the virtual conferencing device assigned to the selected one of the meeting rooms during the confirmation time period correlated to the one of the scheduled time periods.

18 Claims, 9 Drawing Sheets

METHODS FOR MANAGING NO-TOUCH MEETING ROOM CONFIRMATION THROUGH VIRTUAL ATTENDANCE AND DEVICES THEREOF

This application claims the benefit of U.S. Provisional Patent Application Ser. No. 63/757,742, filed Feb. 12, 2025, which is incorporated herein by reference in its entirety.

FIELD

This technology generally relates to methods for managing no-touch meeting room confirmation through virtual attendance and devices thereof.

BACKGROUND

Efficient management of meeting rooms is a persistent challenge in organizations, particularly in high-demand environments. A common issue is the prevalence of "ghost meetings," where meeting rooms are booked, but remain unused. To combat this, companies often require employees to confirm their usage of the room. If the reservation is not confirmed, the booking is automatically released.

However, this approach can result in rooms being prematurely released when users fail to confirm their reservations manually. This leads to unnecessary disruptions, underutilized spaces, and administrative inefficiencies.

Traditional systems rely on manual confirmation methods, such as touch panels, QR codes, or mobile apps, to mark a meeting room as occupied. These methods, however, are prone to user neglect or error and are not always effective in preventing ghost meetings.

The lack of no-touch, seamless approach to confirming meeting room reservations exacerbates this issue. Organizations require a smarter, technology-driven solution that eliminates the need for extra hardware while ensuring efficient room management.

SUMMARY

A method for managing no-touch meeting room confirmation through virtual attendance and is implemented by one or more meeting management computing devices includes identifying in a calendar application a reservation of one of one or more meeting rooms for one of a plurality scheduled time periods by a requesting client at one of one or more client devices. Next, there is monitoring for an initiation of a virtual communication with a virtual conferencing device assigned to the selected one of the meeting rooms during a confirmation time period correlated to the one of the scheduled time periods. A status notification for the selected one of the meeting rooms is generated and provided based on the monitoring detecting the initiation of the virtual communication with the virtual conferencing device assigned to the selected one of the meeting rooms during the confirmation time period correlated to the one of the scheduled time periods.

A meeting management computing device, comprising memory comprising programmed instructions stored thereon and one or more processors configured to execute the stored programmed instructions to identify in a calendar application a reservation of one of one or more meeting rooms for one of a plurality scheduled time periods by a requesting client at one of one or more client devices. Next, there is monitoring for an initiation of a virtual communication with a virtual conferencing device assigned to the selected one of the meeting rooms during a confirmation time period correlated to the one of the scheduled time periods. A status notification for the selected one of the meeting rooms is generated and provided based on the monitoring detecting the initiation of the virtual communication with the virtual conferencing device assigned to the selected one of the meeting rooms during the confirmation time period correlated to the one of the scheduled time periods.

A non-transitory machine readable medium having stored thereon instructions comprising executable code that, when executed by one or more processors, causes the processors to identify in a calendar application a reservation of one of one or more meeting rooms for one of a plurality scheduled time periods by a requesting client at one of one or more client devices. Next, there is monitoring for an initiation of a virtual communication with a virtual conferencing device assigned to the selected one of the meeting rooms during a confirmation time period correlated to the one of the scheduled time periods. A status notification for the selected one of the meeting rooms is generated and provided based on the monitoring detecting the initiation of the virtual communication with the virtual conferencing device assigned to the selected one of the meeting rooms during the confirmation time period correlated to the one of the scheduled time periods.

Examples of this technology provide a number of advantages including more effective and efficient methods, non-transitory computer readable media, and devices for managing no-touch meeting room confirmation through virtual attendance. With examples of this technology, the need for manual intervention is eliminated by automatically confirming room reservations based on videoconference activity. Additionally, examples of this technology provide multiplatform compatibility with configured integration with a variety of types of videoconferencing applications, such as Google Meet, Microsoft Teams, and Zoom by way of example, ensuring broader applicability across organizations using different visio-conferencing or video-conferencing platforms. Examples of this technology also enable real-time confirmation immediately upon detecting the room as a participant in the scheduled meeting. Further, examples of this technology provide improved resource utilization by preventing premature release of rooms, ensuring optimal utilization and a reduction in booking conflicts. Examples of this technology also further assist with error reduction minimizing human errors associated with manual check-ins or confirmations. Examples of this technology also ensure privacy compliance by only utilizing minimal, necessary data (e.g., room ID) for managing no-touch meeting room confirmation to align with GDPR and other privacy regulations.

DETAILED DESCRIPTION

Figure 1:
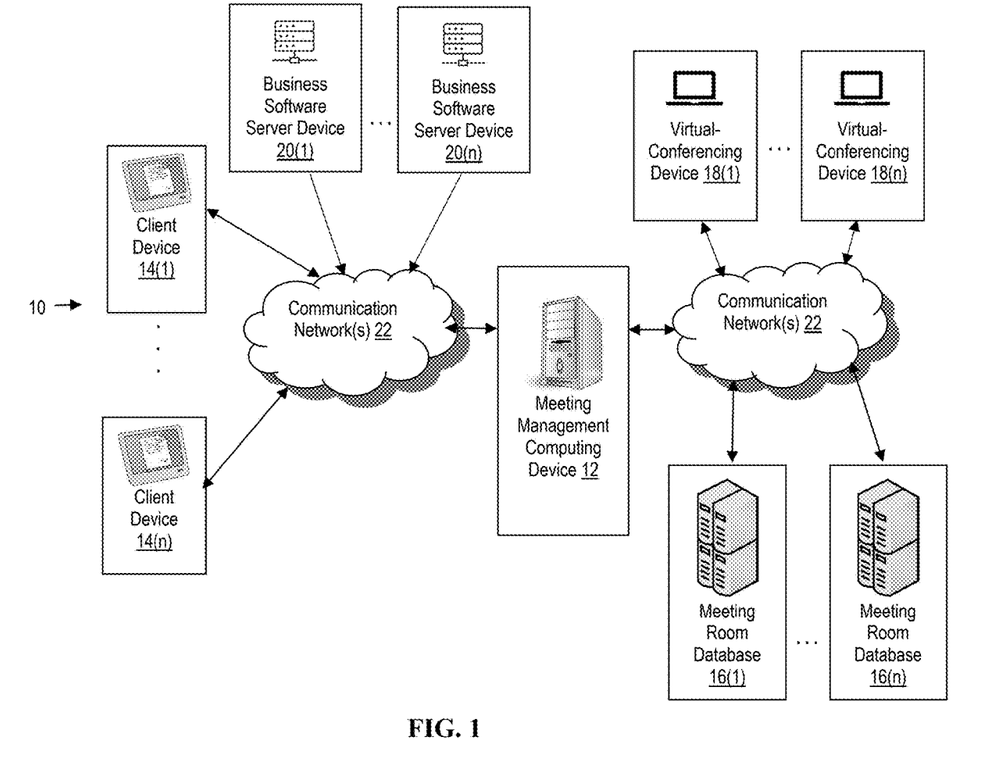
FIG. 1 is a diagram of an exemplary environment with an example of a meeting management computing device configured to manage no-touch meeting room confirmation through virtual attendance.
Figure 2:
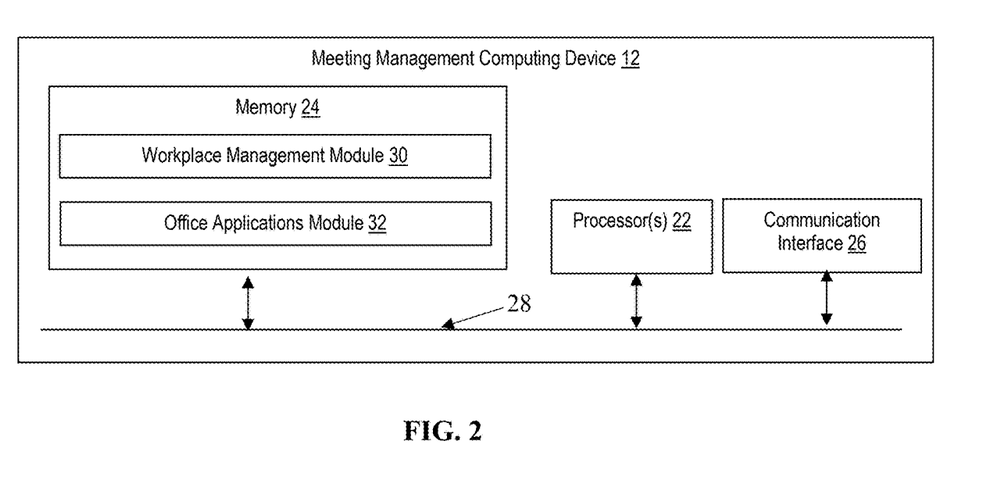
FIG. 2 is a block diagram of the example of the meeting management computing device shown in FIG. 1.

An exemplary network environment 10 with an example of a meeting management computing device 12 configured to manage no-touch meeting room confirmation through virtual attendance is illustrated in FIGS. 1-2. The exemplary environment 10 includes the meeting management computing device 12, client devices 14(1)-14(n), a meeting room databases 16(1)-16(n), and virtual-conferencing devices 18(1)-18(n), business software server devices 20(1)-20(n) coupled together by communication networks 22, although the exemplary environment could include other types and/or numbers of other systems, devices, components, and/or other elements in other configurations. This technology provides a number of advantages including managing no-touch meeting room confirmation through virtual attendance.

Referring more specifically to FIGS. 1-2, the meeting management computing device 12 may perform any number of functions including managing no-touch meeting room confirmation through virtual attendance as illustrated and described by way of the examples herein. The meeting management computing device 12 in this example includes processor(s) 22, a memory 24, and/or a communication interface 26, which are coupled together by a bus 28 or other communication link, although the meeting management computing device 12 can include other types and/or numbers of elements in other configurations. The processor(s) 22 of the meeting management computing device 12 may execute programmed instructions stored in the memory 24 for the any number of the functions described and illustrated herein. The processor(s) 22 of the meeting management computing device 12 may include one or more CPUs or general purpose processors with one or more processing cores, for example, although other types of processor(s) can also be used.

The memory 24 of the meeting management computing device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Accordingly, the memory 24 of the meeting management computing device 12 can store application(s) that can include executable instructions that, when executed by the processor(s) 22, cause the meeting management computing device 12 to perform actions, such as described and illustrated below with reference to FIGS. 3-6B. The application(s) can be implemented as modules or components of other application(s). Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the meeting management computing device 12 itself, may be located in virtual server(s) running in a cloud-based computing environment rather than being tied to one or more specific physical network computing devices. Also, the application(s) may be running in one or more virtual machines (VMs) executing on the meeting management computing device 12. Additionally, in one or more embodiments of this technology, virtual machine(s) running on the meeting management computing device 12 may be managed or supervised by a hypervisor.

In this particular example, the memory 24 of the meeting management computing device 12 includes a workplace management module 30 and an office applications module 32, although the memory 24 can include other types and/or numbers of other policies, modules, programmed instructions, applications, and/or databases. The workplace management module 30 in this example is configured with programmed instructions, modules, and/or other data to manage algorithms and other operations associated with the workflow of the meeting management computing device 12 and create executable instructions for one or more of the processes described herein in FIGS. 3-6B, for example. The office applications module 32 comprises programmed instructions, templates, and data relating to office applications, such as meeting room calendar management applications, video-conferencing applications, and chat applications by way of example only, although the module can include other types and/or numbers of other policies, modules, programmed instructions, applications, and/or databases.

The communication interface 26 of the meeting management computing device 12 operatively couples and communicates between the meeting management computing device 12 and the client devices 14(1)-14(n), the meeting room databases 16(1)-16(n), the virtual-conferencing devices 18(1)-18(n), and the business server devices 20(1)-20(n) which are all coupled together by the communication networks 22, although other types and/or numbers of communication networks or systems with other types and/or numbers of connections and/or configurations to other devices and/or elements can also be used.

By way of example only, the communication networks 22 can include local area network(s) (LAN(s)) or wide area network(s) (WAN(s)), and can use TCP/IP over Ethernet and industry-standard protocols, although other types and/or numbers of protocols and/or communication networks can be used. The communication networks 22 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The client devices 14(1)-14(n) in this example include any type of computing device that can interface with the meeting management computing device 12 to utilize video conference applications, calendar applications, and/or other applications and to receive and/or submit data and/or interact with one or more APIs and/or GUI(s). Each of the client devices 14(1)-14(n) in this example includes a processor, a memory, and a communication interface, which are coupled together by a bus or other communication link, although other numbers and/or types of network devices could be used. The memory in the client devices 14(1)-14(n) may download and store or otherwise access applications and/or programmed instructions for calendar applications, video conference applications, chat, and/or other applications and/or may access web versions which are executed by the processor in the client devices 14(1)-14(n) as illustrated and described by way of the examples herein.

The client devices 14(1)-14(n) may also run interface applications, such as standard web browsers or standalone client applications, which may provide an interface to communicate with the meeting management computing device 12 via the communication network(s) 22. The client devices 14(1)-14(n) may have a keyboard and/or mouse or other input device, such as a voice interface device, to enter inputs, although other input devices, such as an input devices may also be used, such as a touchscreen by way of example. In this example, the client devices 14(1)-14(n) also include a display device, such as a display screen or touchscreen, and one or more other input devices. In one example, the client devices 14(1)-14(n) can be utilized to reserve a meeting room for a designated time period and utilize one or more meeting rooms for video conferencing or chat applications during the reserved time period.

Each of the meeting room databases 16(1)-16(n) in this example includes processor(s), a memory, and a communication interface, which are coupled together by a bus or other communication link, although other numbers and/or types of server and/or network devices could be used. The meeting room databases 16(1)-16(n) in this example host meeting room data and/or other content and/or data associated with meeting rooms, although the meeting room databases 16(1)-16(n) may host data and/or instructions. Although the meeting room databases 16(1)-16(n) are illustrated as single devices, one or more actions of the meeting room databases 16(1)-16(n) may be distributed across one or more distinct network computing devices that together comprise one or more of the meeting room databases 16(1)-16(n). Moreover, the meeting room databases 16(1)-16(n) are not limited to a particular configuration or to one particular entity and may be managed by multiple different entities.

The virtual-conferencing devices 18(1)-18(n) in this example may include any type of virtual conferencing devices, such as video conferencing hardware devices or chat-based conferencing computing devices by way of example only. Each of the virtual-conferencing devices 18(1)-18(n) in this example includes a processor, a memory, and a communication interface, which are coupled together by a bus or other communication link, although other numbers and/or types of network devices could be used. The virtual-conferencing devices 18(1)-18(n) may run interface applications, such as standard Web browsers or standalone client applications, which may provide an interface to make requests for, and receive content stored on, one or more of the database(s), computing device(s), server device(s) and/or other via the communication network(s) 22. The virtual-conferencing devices 18(1)-18(n) may further include a display device, such as a display screen or touchscreen, and/or an input device, such as a keyboard for example. Optionally, one or more of the virtual-conferencing devices 18(1)-18(n) may further comprise other built-in and already existing sensing hardware or other components, such as a motion, light, and/or sound detector(s) which in other examples can be identified and utilized by the meeting management computing device 12 for additional monitoring of the status of the selected one of the meeting rooms during an confirmation time period correlated to the one of the scheduled time periods as described in the examples herein without the incorporation or need of additional separate hardware.

The business server devices 20(1)-20(n) are configured in this example to manage and provide office applications, such as meeting room calendar management applications, video-conferencing applications, e.g. Google Meet, Microsoft Teams, or Zoom, and chat applications by way of example only, to one or more of the client device 14(1)-14(n) in this example. Each of the business server devices 20(1)-20(n) in this example includes a processor, a memory, and a communication interface, which are coupled together by a bus or other communication link, although other numbers and/or types of network devices could be used.

Although the exemplary network environment 10 with the meeting management computing device 12, client devices 14(1)-14(n), meeting room databases 16(1)-16(n), virtual-conferencing devices 18(1)-18(n), business software server devices 20(1)-20(n), and communication networks 22 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

There may be more or fewer meeting management computing devices 12, client devices 14(1)-14(n), 16(1)-16(n), virtual-conferencing devices 18(1)-18(n), business software server devices 20(1)-20(n), communication networks 22 and/or other systems, devices, components, and/or other elements than illustrated in FIG. 1. In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only wireless networks, cellular networks, PDNs, the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processor(s) to carry out steps necessary to implement the methods of the examples of this technology that are described and illustrated.

An example of a method for managing no-touch meeting room confirmation through virtual attendance will now be illustrated and described with reference to FIGS. 1-6B.

Figure 3:
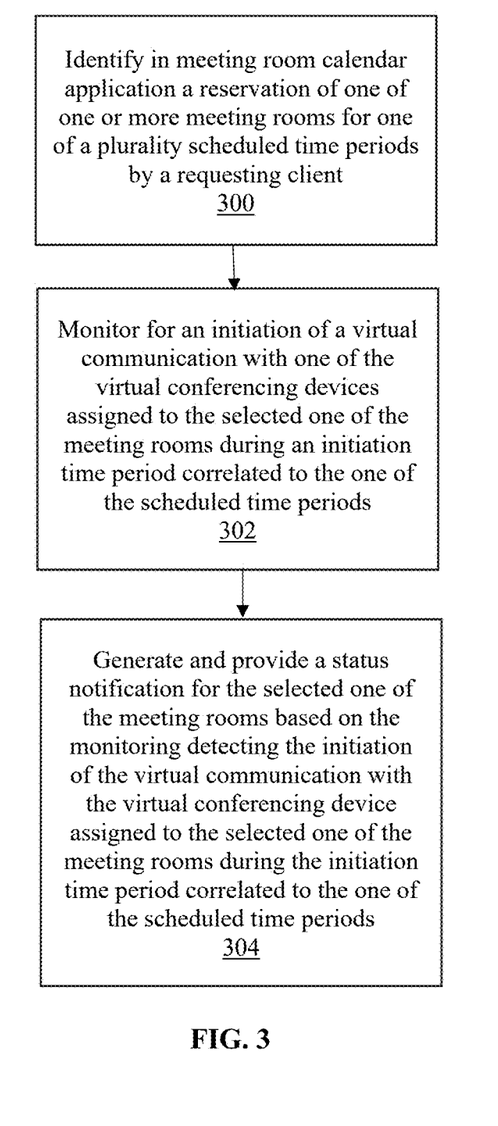
FIG. 3 is a flow diagram of an example of a method for managing no-touch meeting room confirmation through virtual attendance.

Referring more specifically to FIG. 3, in this example in step 300 the meeting management computing device 12 identifies in a calendar application a reservation of one of one or more meeting rooms for one of a plurality scheduled time periods by a requesting client at one of one or more client devices 14(1)-14(n).

Next, in step 302 the meeting management computing device 12 monitors for an initiation of a virtual communication with one of the virtual conferencing devices 18(1)-18(n) assigned to the selected one of the meeting rooms during a confirmation time period correlated to the one of the scheduled time periods. In this example the confirmation time period extends for a set period of time before and through the scheduled time period, although other confirmation time periods could be used, such as for set period of time before and into the schedule time period, but not the entire scheduled time period by way of example only.

In this example, the monitoring for the initiation by the meeting management computing device 12 may further include obtaining a client identifier associated with the initiation at the virtual conferencing device by the requesting client and one of the client devices 14(1)-14(n). Once the client identifier has been obtained, the meeting management computing device 12 may determine whether the obtained client identifier corresponds to the requesting client at the one of the client devices 14(1)-14(n) associated with the reservation, wherein the generating the status notification is further based on the determination whether the obtained client identifier corresponds to the requesting client associated with the reservation Next, in step 304 the meeting management computing device 12 generates and provides a status notification for the selected one of the meeting rooms based on the monitoring detecting the initiation of the virtual communication with the virtual conferencing device assigned to the selected one of the meeting rooms during the confirmation time period correlated to the one of the scheduled time periods.

In this example, the generated status notification comprises a checked-in status notification when the monitoring by the meeting management computing device 12 indicates: the initiation communication is at the virtual conferencing device assigned to the selected one of the meeting rooms; the initiation communication is during the confirmation time period that is correlated to the one of the scheduled time periods; and the obtained client identifier corresponds to the requesting client, although other manners for determining when the generated status notification comprises a checked-in status notification can be used. Additionally in this example, the generated status notification comprises a release status notification when the monitoring by the meeting management computing device 12 indicates: the initiation communication is not at the virtual conferencing device assigned to the selected one of the meeting rooms; the initiation communication is not during the confirmation time period that is correlated to the one of the scheduled time periods; or the obtained client identifier does not correspond to the requesting client device In this example, the meeting management computing device 12 provides the generated status notification to the requesting one of the client devices 14(1)-14(n), although the meeting management computing device 12 may provide and/or utilize the generated status notification in other manners, such as updating the calendar application in real time based on the generated status notification by way of example only. Additional examples will now be illustrated and described below.

Figure 4A:
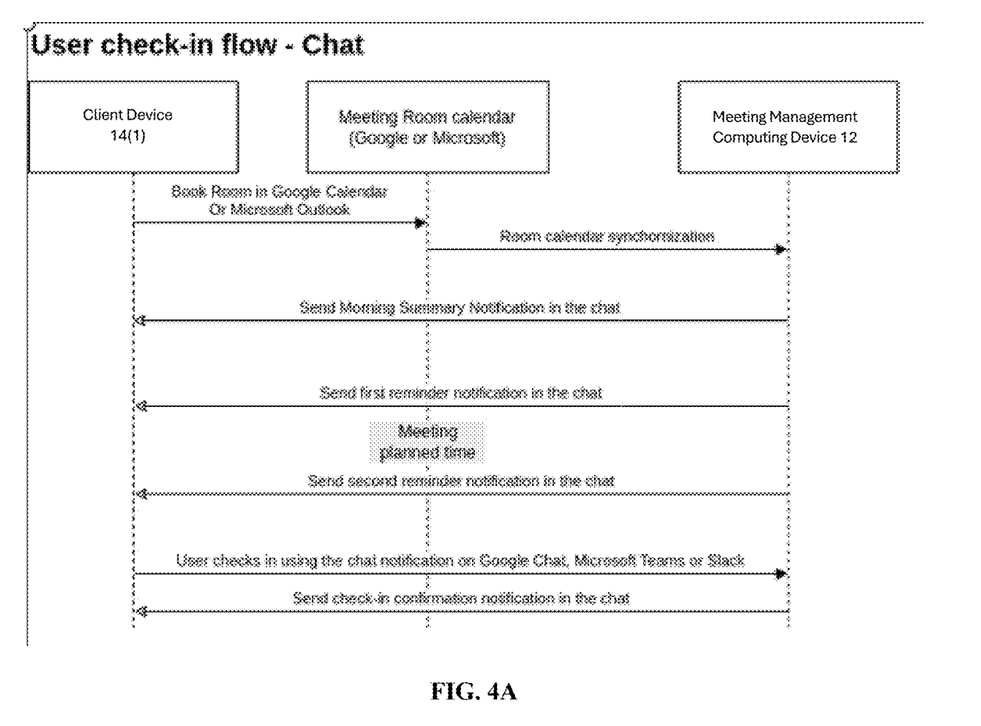
FIG. 4A is a timing diagram of an example of a method for a user check-in with chat.
Figure 5A:
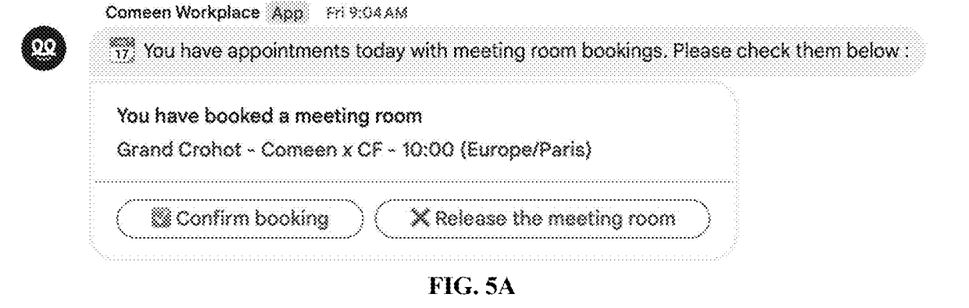
FIG. 5A is a screenshot of an example of morning summary notification.
Figure 5B:
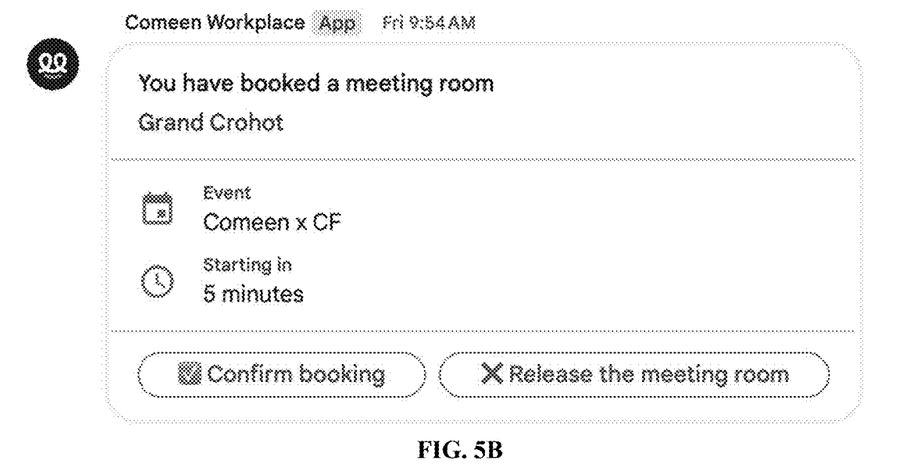
FIG. 5B is a screenshot of an example of first reminder notification.
Figure 5C:
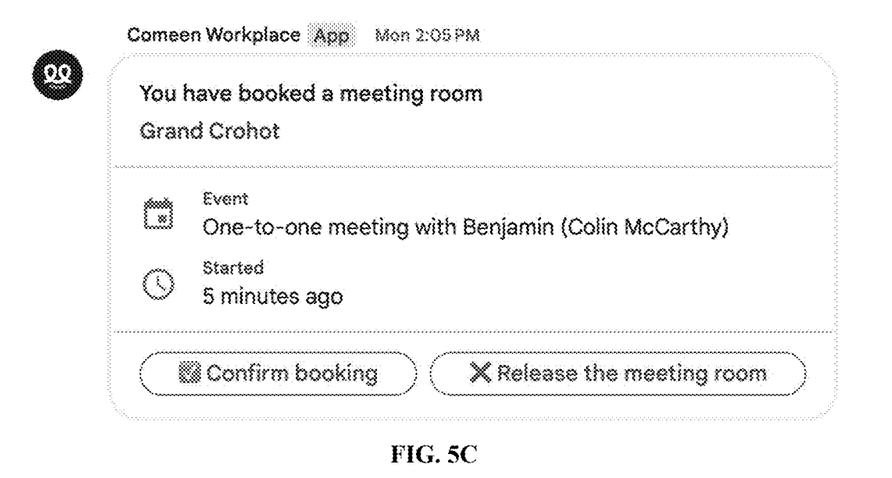
FIG. 5C is a screenshot of an example of second reminder notification.
Figure 5D:
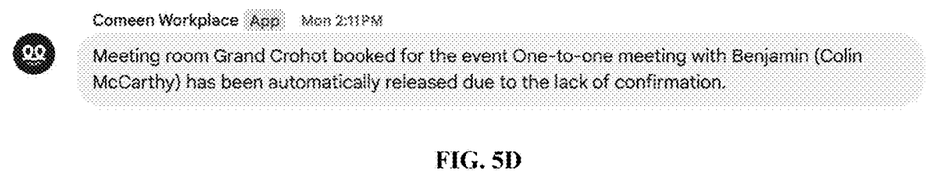
FIG. 5D is a screenshot of an example of release confirmation notification.
Figure 5E:
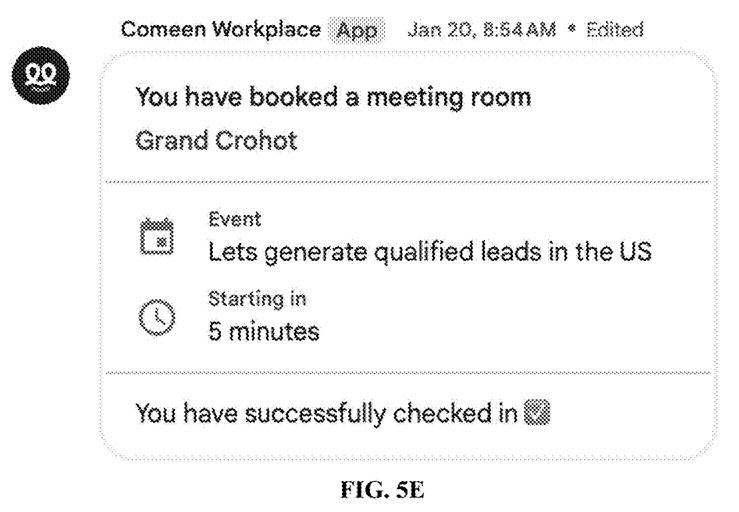
FIG. 5E is a screenshot of an example of regular check-in confirmation notification.

Referring to FIG. 4A, a timing diagram of an example of a method for a user check-in with chat in accordance with examples of this technology is illustrated. In this example, the client device 14(1) books a meeting room in a calendar application, such as Google calendar or Microsoft Outlook, provided by and/or managed by one of the business software server devices 20(1)-20(n). Next, the meeting management computing device 12 identifies by a periodic synchronization process in the calendar application, although other approaches for making this identification could be used, a reservation of one of one or more meeting rooms for one of a plurality scheduled time periods by a requesting client at client device 14(1) in this example. Next, the meeting management computing device 12 send an initial summary notification prior to the meeting, such as the morning of the scheduled meeting in the meeting room, by chat to the client device 14(1). An example of the initial summarization notification with the reserved meeting room sent by chat is illustrated in FIG. 5A. Next, the meeting management computing device 12 sends a first reminder regarding the reservation to the client device 14(1) a set time prior to the planned meeting time, such as at the start of a confirmation time period which overlaps over the start time of the scheduled meeting room reservation by way of example. An example of a follow-up reminder notification regarding the reserved meeting room sent by chat five minutes before a reserved time for the scheduled meeting is illustrated in FIG. 5B. Next, the meeting management computing device 12 sends a second reminder regarding the reservation to the client device 14(1), if there has been no confirmation, with a set time shortly after the reserved meeting time, such as a set time period after the scheduled start time of the scheduled meeting room reservation by way of example. An example of a second follow-up reminder notification with the reserved meeting room sent by chat five minutes after a reserved meeting time for the scheduled meeting is illustrated in FIG. 5C. Next, in this example the client device 14 checks in with the meeting management computing device 12 using chat, such as chat application like Google Chat, Microsoft Teams, or Slack. In response, the meeting management computing device 12 sends a check-in status confirmation to the client device 14(1) and may optionally in real time record a confirmation of the check-in to provide a status notification for the availability of the meeting room. An example of a check-in confirmation notification regarding the reserved meeting room is illustrated in FIG. 5E.

Figure 4B:
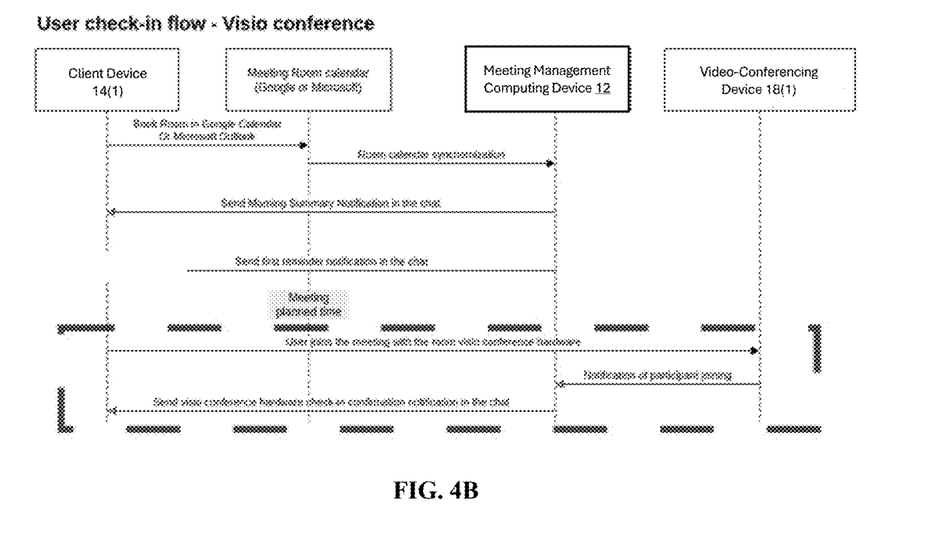
FIG. 4B is a timing diagram of an example of a method for a user check-in for a video-conference.
Figure 5F:
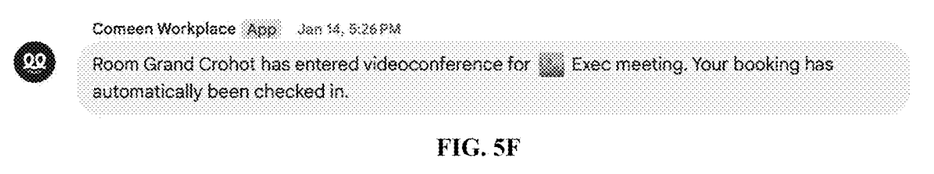
FIG. 5F is a screenshot of an example of video-conferencing hardware check-in confirmation notification.

Referring to FIG. 4B, a timing diagram of an example of a method for a user check-in for a video-conference in accordance with examples of this technology is illustrated. In this example, the client device 14(1) books a meeting room in a calendar application, such as Google calendar or Microsoft Outlook, provided by and/or managed by one of the business software server devices 20(1)-20(n). Next, the meeting management computing device 12 identifies by a periodic synchronization process in the calendar application, although other approaches for making this identification could be used, a reservation of one of one or more meeting rooms for one of a plurality scheduled time periods by a requesting client at client device 14(1) in this example. Next, the meeting management computing device 12 send an initial summary notification prior to the meeting, such as the morning of the scheduled meeting in the meeting room, by chat to the client device 14(1). An example of the initial summarization notification with the reserved meeting room sent by chat is illustrated in FIG. 5A. Next, the meeting management computing device 12 sends a first reminder regarding the reservation to the client device 14(1) a set time prior to the planned meeting time, such as at the start of a confirmation time period which overlaps over the start time of the scheduled meeting room reservation by way of example. An example of a follow-up reminder notification with the reserved meeting room sent by chat five minutes before a reserved time for the scheduled meeting is illustrated in FIG. 5B. Next, within a confirmation time period the client device 14 joins the conference using the video-conferencing device 18(1) assigned to the meeting room which sends a notification of this joining to the meeting management computing device 12, although other manners for monitoring and detecting the use of the video-conferencing device 18(1) can be used. In response, the meeting management computing device 12 sends a check-in status confirmation to the client device 14(1) in this example via chat and may optionally in real time record a confirmation of the check-in to provide a status notification for the availability of the meeting room. An example of a check-in confirmation notification regarding the reserved meeting room is illustrated in FIG. 5F.

Figure 4C:
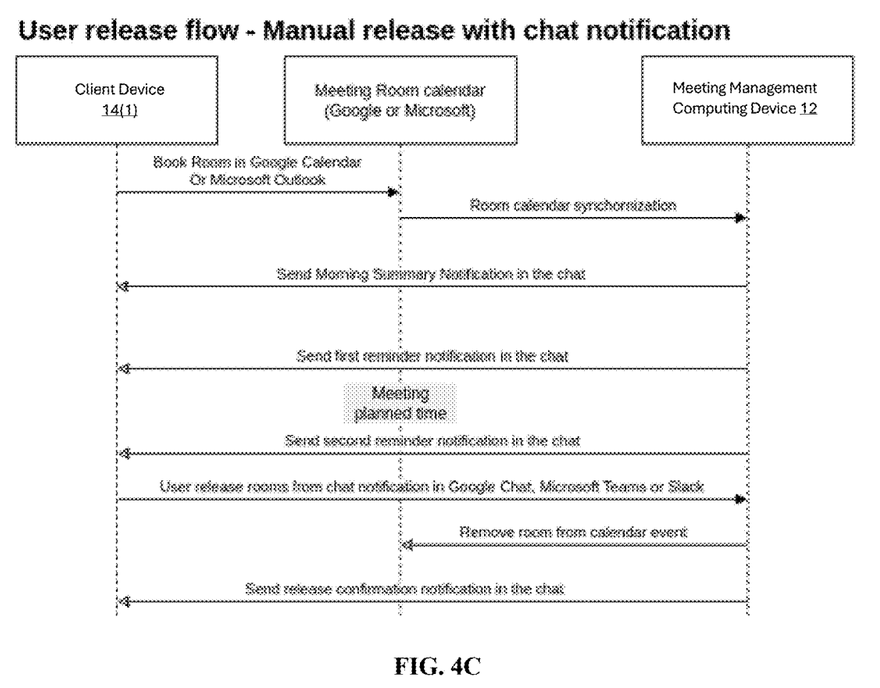
FIG. 4C is a timing diagram of an example of a method for a user release for a video-conference.

Referring to FIG. 4C, a timing diagram of an example of a method for a user release for a video-conference in accordance with examples of this technology is illustrated. In this example, the client device 14(1) books a meeting room in a calendar application, such as Google calendar or Microsoft Outlook, provided by and/or managed by one of the business software server devices 20(1)-20(n). Next, the meeting management computing device 12 identifies by a periodic synchronization process in the calendar application, although other approaches for making this identification could be used, a reservation of one of one or more meeting rooms for one of a plurality scheduled time periods by a requesting client at client device 14(1) in this example. Next, the meeting management computing device 12 send an initial summary notification prior to the meeting, such as the morning of the scheduled meeting in the meeting room, by chat to the client device 14(1). An example of the initial summarization notification with the reserved meeting room sent by chat is illustrated in FIG. 5A. Next, the meeting management computing device 12 sends a first reminder regarding the reservation to the client device 14(1) a set time prior to the planned meeting time, such as at the start of a confirmation time period which overlaps over the start time of the scheduled meeting room reservation by way of example. An example of the initial reminder notification with the reserved meeting room sent by chat five minutes before the scheduled meeting is illustrated in FIG. 5B. Next, the meeting management computing device 12 sends a second reminder regarding the reservation to the client device 14(1), if there has been no confirmation, with a set time shortly after the planned meeting time, such as a set time period after the scheduled start time of the scheduled meeting room reservation by way of example. Next, in this example the client device 14 releases the room in a chat notification to the meeting management computing device 12, such as chat application like Google Chat, Microsoft Teams, or Slack. In response, the meeting management computing device 12 sends a release status confirmation to the client device 14(1) in this example and may optionally in real time record a confirmation of the release to provide a status notification for the availability of the meeting room.

Figure 4D:
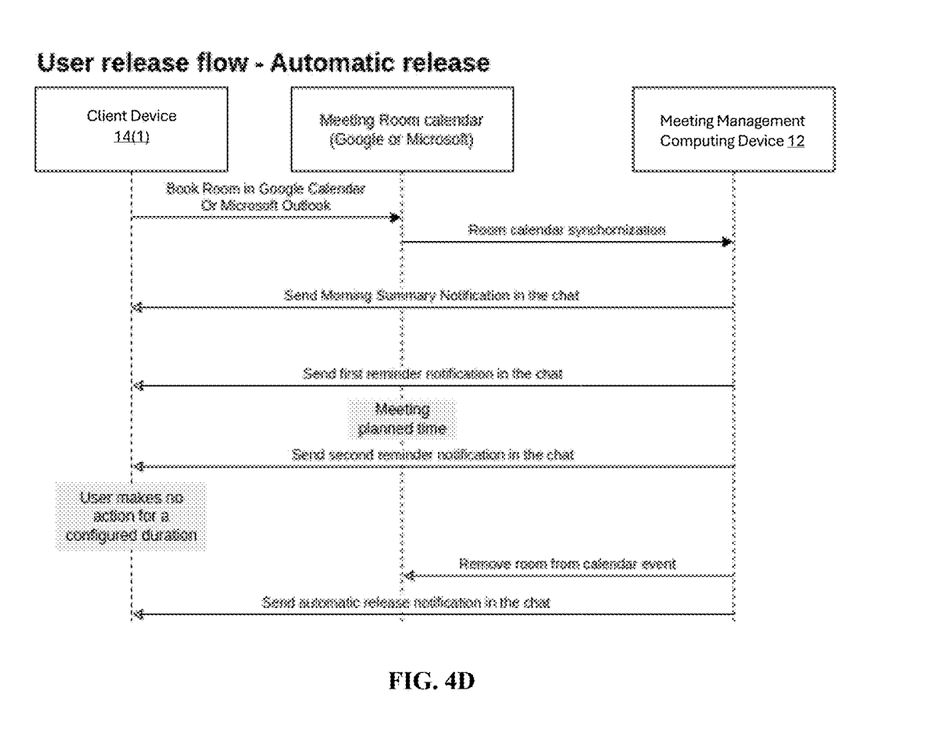
FIG. 4D is a timing diagram of an example of a method for a no-touch user release for a video-conference.

Referring to FIG. 4D, a timing diagram of an example of a method for a no-touch user release for a video-conference in accordance with examples of this technology is illustrated. In this example, the client device 14(1) books a meeting room in a calendar application, such as Google calendar or Microsoft Outlook, provided by and/or managed by one of the business software server devices 20(1)-20(n). Next, the meeting management computing device 12 identifies by a periodic synchronization process in the calendar application, although other approaches for making this identification could be used, a reservation of one of one or more meeting rooms for one of a plurality scheduled time periods by a requesting client at client device 14(1) in this example. Next, the meeting management computing device 12 send an initial summary notification prior to the meeting, such as the morning of the scheduled meeting in the meeting room, by chat to the client device 14(1). An example of the initial summarization notification with the reserved meeting room sent by chat is illustrated in FIG. 5A. Next, the meeting management computing device 12 sends a first follow-up reminder regarding the reservation to the client device 14(1) a set time prior to the planned meeting time, such as at the start of a confirmation time period which overlaps over the start time of the scheduled meeting room reservation by way of example. An example of a follow-up reminder notification with the reserved meeting room sent by chat five minutes before the scheduled meeting is illustrated in FIG. 5B. Next, the meeting management computing device 12 sends a second reminder regarding the reservation to the client device 14(1), if there has been no confirmation, with a set time shortly after the reserved meeting time, such as a set time period after the scheduled start time of the scheduled meeting room reservation by way of example. An example of a second follow-up reminder notification with the reserved meeting room sent by chat five minutes after a reserved meeting time for the scheduled meeting is illustrated in FIG. 5C. Next, after the end of a confirmation time period, in this example a set time after the scheduled time for the meeting room reservation, the client device 14 never joins the conference using the video-conferencing device 18(1) assigned to the meeting room. In response, the meeting management computing device 12 sends a release status confirmation to the client device 14(1) in this example via chat and may optionally in real time record a release of the meeting room in the calendar application. An example of a release confirmation notification regarding the reserved meeting room is illustrated in FIG. 5D.

Figure 6A:
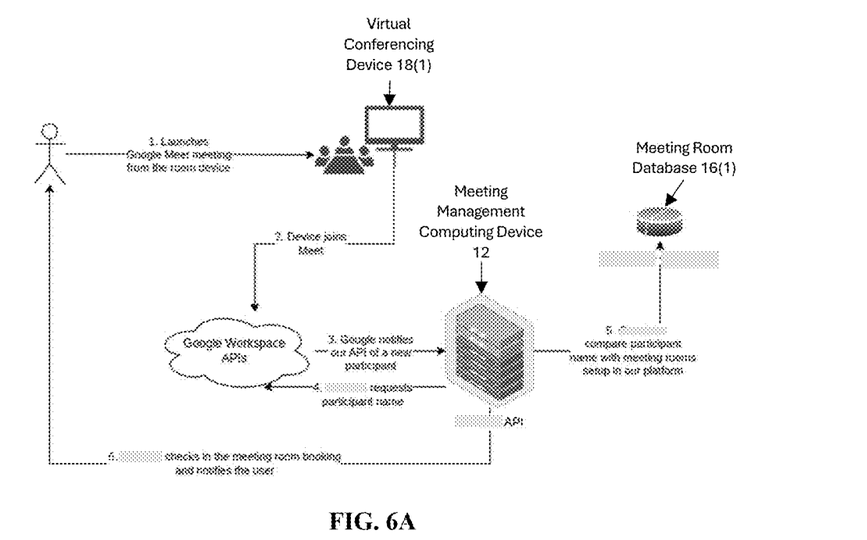
FIGS. 6A-B are functional flow diagrams of other examples of a method for managing no-touch meeting room confirmation through virtual attendance.

Referring to FIG. 6A, a functional flow diagram of another example of a method for managing no-touch meeting room confirmation through virtual attendance using video conferencing application, such as Google Meet, is illustrated. In this example, a requesting client at client device 14(1) launches a Google Meet session from a virtual conferencing device 18(1). This establishes the initial connection between the virtual conferencing device 18(1) and the virtual meeting. The virtual conferencing device 18(1) joins the Google Meet session as a participant, appearing in the list of attendees. Next, the Google Workspace APIs notify the meeting management computing device 12 (via a custom API built into the platform) about the new participant joining the meeting. In this example, the meeting management computing device 12 only gets a participant API and the Meet Space ID, the meeting management computing device 12 then has to call a Google Meet API endpoint to get the actual participant name. Next, the meeting management computing device 12 system queries the Google Workspace APIs to fetch the participant details (e.g., the name or identifier of the room) from the meeting room database 16(1). The meeting management computing device 12 cross-references the retrieved participant name with the list of meeting rooms stored in the meeting room database 16(1) to verify whether the joining participant matches the booked meeting room. If the participant matches the booked room, the meeting management computing device 12 automatically confirms the room reservation in the booking platform. Additionally, a notification is sent to the user at the client device 14(1) confirming the check-in.

Figure 6B:
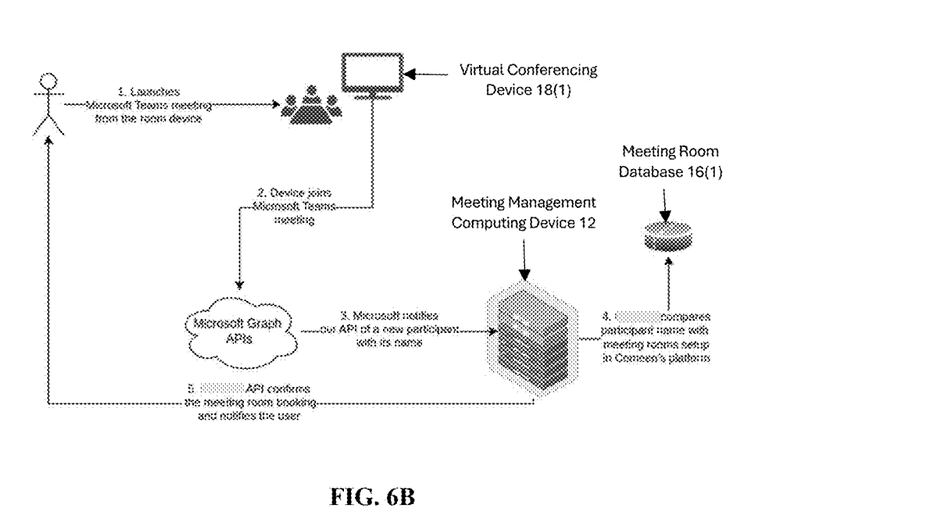

Referring to FIG. 6B, a functional flow diagram of another example of a method for managing no-touch meeting room confirmation through virtual attendance using video conferencing application, such as Microsoft Teams is illustrated. In this example, a requesting client at client device 14(1) launches Workflow for Microsoft Team meetings through Microsoft Teams Rooms. Next, a client at one of the client devices 14(1) in this example schedules and launches a Microsoft Teams meeting using the virtual conferencing device 18(1) (e.g., a Teams-enabled conference system tied to the room's calendar like Microsoft Teams Rooms or Zoom Room). The virtual conferencing device 18(1), such as a Microsoft Teams Room (MTR) or Zoom Room device, automatically joins the scheduled Teams meeting as a participant. This virtual conferencing device 18(1) represents the physical meeting room in the participant list. Next, the Microsoft Graph APIs notify the meeting management computing device 12 when a new participant joins the meeting. This notification includes directly participant information, such as the name or identifier of the room. In this example, the details are encrypted and need to be decoded. The meeting management computing device 12 cross-references this information with the pre-configured room data stored in the Comeen database to verify that the joining participant matches the booked meeting room. If the room is detected as a participant, the meeting management computing device 12 confirms the room booking in the meeting room reservation platform. A notification is sent to the user at the client device 14(1) to confirm that the meeting room has been successfully checked in.

Accordingly as illustrated by way of the examples herein, this technology provides a number of advantages including more effective and efficient methods, non-transitory computer readable media, and devices for managing no-touch meeting room confirmation through virtual attendance. Examples of this technology are able to utilize platform-specific APIs (such as Google Meet APIs or Microsoft Graph API) for real-time monitoring of participant activity in meetings and meeting management computing device 12 APIs for database interactions. Example of this technology also ensures robust identity verification by comparing the participant name from virtual conferencing devices, such as Google Meet Hardware and Microsoft Teams Room, with the pre-configured room data stored in the meeting room database. Additionally, examples of this technology eliminate the need for manual check-ins by marking the reservation as confirmed if the room is detected as an attendee. Further, examples of this technology provide a fallback mechanism in cases where the room fails to join the meeting within a predefined period (e.g., 10 minutes after the meeting's scheduled start time), the meeting management computing device releases the reservation, making the room available for other users.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the processes to any order.

What is claimed is:

1. A method for managing no-touch meeting room confirmation through virtual attendance, the method implemented by one or more meeting management computing devices and comprising:
   identifying in a calendar application a reservation of one of one or more meeting rooms for one of a plurality scheduled time periods by a requesting client at one of one or more client devices;
   monitoring for no-touch meeting room confirmation based on an initiation of a virtual communication with a virtual conferencing device assigned to the selected one of the meeting rooms during a confirmation time period correlated to the one of the scheduled time periods; and
   generating and providing a status notification for the selected one of the meeting rooms based on the monitoring detecting the initiation of the virtual communication with the virtual conferencing device assigned to the selected one of the meeting rooms during the confirmation time period correlated to the one of the scheduled time periods.

2. The method as set forth in claim 1 wherein the monitoring for the initiation further comprises:
   obtaining a client identifier associated with the initiation at the virtual conferencing device; and
   determining whether the obtained client identifier corresponds to the requesting client at the one of the client devices associated with the reservation, wherein the generating the status notification is further based on the determination whether the obtained client identifier corresponds to the requesting client associated with the reservation.

3. The method as set forth in claim 2 wherein the generated status notification comprises a checked-in status notification when the monitoring indicates: the initiation communication is at the virtual conferencing device assigned to the selected one of the meeting rooms; the initiation communication is during the confirmation time period that is correlated to the one of the scheduled time periods; and the obtained client identifier corresponds to the requesting client.

4. The method as set forth in claim 2 wherein the generated status notification comprises a release status notification when the monitoring indicates: the initiation communication is not at the virtual conferencing device assigned to the selected one of the meeting rooms; the initiation communication the initiation communication is not during the confirmation time period that is correlated to the one of the scheduled time periods; or the obtained client identifier does not correspond to the requesting client device.

5. The method as set forth in claim 1 wherein the virtual conferencing device comprises a video conferencing device or a chat-based conferencing computing device.

6. The method as set forth in claim 1 further comprising:
   updating the calendar application in real time based on the generated status notification.

7. A meeting management computing device, comprising memory comprising programmed instructions stored thereon and one or more processors configured to execute the stored programmed instructions to:
   identify in a calendar application a reservation of one of one or more meeting rooms for one of a plurality scheduled time periods by a requesting client at one of one or more client devices;

monitor for no-touch meeting room confirmation based on an initiation of a virtual communication with a virtual conferencing device assigned to the selected one of the meeting rooms during a confirmation time period correlated to the one of the scheduled time periods; and generate and provide a status notification for the selected one of the meeting rooms based on the monitoring detecting the initiation of the virtual communication with the virtual conferencing device assigned to the selected one of the meeting rooms during the confirmation time period correlated to the one of the scheduled time periods.

8. The device as set forth in claim 7 wherein for the monitor for the initiation, wherein the processors are further configured to execute the stored programmed instructions to:

obtain a client identifier associated with the initiation at the virtual conferencing device; and determine whether the obtained client identifier corresponds to the requesting client at the one of the client devices associated with the reservation, wherein the generating the status notification is further based on the determination whether the obtained client identifier corresponds to the requesting client associated with the reservation.

9. The device as set forth in claim 8 wherein the generated status notification comprises a checked-in status notification when the monitoring indicates: the initiation communication is at the virtual conferencing device assigned to the selected one of the meeting rooms; the initiation communication is during the confirmation time period that is correlated to the one of the scheduled time periods; and the obtained client identifier corresponds to the requesting client.

10. The device as set forth in claim 8 wherein the generated status notification comprises a release status notification when the monitoring indicates: the initiation communication is not at the virtual conferencing device assigned to the selected one of the meeting rooms; the initiation communication is not during the confirmation time period that is correlated to the one of the scheduled time periods; or the obtained client identifier does not correspond to the requesting client device.

11. The device as set forth in claim 6 wherein the virtual conferencing device comprises a video conferencing device or a chat-based conferencing computing device.

12. The device as set forth in claim 1 wherein the processors are further configured to execute the stored programmed instructions to:

updating the calendar application in real time based on the generated status notification.

13. A non-transitory machine readable medium having stored thereon instructions comprising executable code that, when executed by one or more processors, causes the processors to:

identify in a calendar application a reservation of one of one or more meeting rooms for one of a plurality of scheduled time periods by a requesting client at one of one or more client devices;

monitor for no-touch meeting room confirmation based on an initiation of a virtual communication with a virtual conferencing device assigned to the selected one of the meeting rooms during a confirmation time period correlated to the one of the scheduled time periods; and generate and provide a status notification for the selected one of the meeting rooms based on the monitoring detecting the initiation of the virtual communication with the virtual conferencing device assigned to the selected one of the meeting rooms during the confirmation time period correlated to the one of the scheduled time periods.

14. The non-transitory machine readable medium as set forth in claim 13 wherein for the monitor for the initiation, the wherein the processors are further configured to execute the stored programmed instructions to:

obtain a client identifier associated with the initiation at the virtual conferencing device; and determine whether the obtained client identifier corresponds to the requesting client at the one of the client devices associated with the reservation, wherein the generating the status notification is further based on the determination whether the obtained client identifier corresponds to the requesting client associated with the reservation.

15. The non-transitory machine readable medium as set forth in claim 14 wherein the generated status notification comprises a checked-in status notification when the monitoring indicates:

the initiation communication is at the virtual conferencing device assigned to the selected one of the meeting rooms; the initiation communication is during the confirmation time period that is correlated to the one of the scheduled time periods; and the obtained client identifier corresponds to the requesting client.

16. The non-transitory machine readable medium as set forth in claim 14 wherein the generated status notification comprises a release status notification when the monitoring indicates: the initiation communication is not at the virtual conferencing device assigned to the selected one of the meeting rooms; the initiation communication is not during the confirmation time period that is correlated to the one of the scheduled time periods; or the obtained client identifier does not correspond to the requesting client device.

17. The non-transitory machine readable medium as set forth in claim 13 wherein the virtual conferencing device comprises a video conferencing device or a chat-based conferencing computing device.

18. The non-transitory machine readable medium as set forth in claim 13 further comprising:

updating the calendar application in real time based on the generated status notification.

* * * * *